United States Patent [19]

Ballinger et al.

[11] 3,875,525

[45] Apr. 1, 1975

[54] DIGITAL AUTOMATIC OSCILLATOR TUNING CIRCUIT

[75] Inventors: Forrest H. Ballinger, Grain Valley; Wilfred L. Farnham, Jr., Kansas City; Robert E. Heggestad, Blue Springs, all of Mo.

[73] Assignee: Harmon Industries, Inc., Grain Valley, Mo.

[22] Filed: July 5, 1974

[21] Appl. No.: 486,195

Related U.S. Application Data

[62] Division of Ser. No. 399,969, Sept. 24, 1973, Pat. No. 3,838,270.

[52] U.S. Cl. ...................... 331/1 A, 246/130, 331/4, 331/14, 331/17, 331/25, 331/36 R, 331/65, 331/167, 331/179, 340/258 C

[51] Int. Cl. ........................... R61l 1/06, H03b 3/04

[58] Field of Search ............ 331/1 A, 4, 14, 17, 18, 331/25, 34, 36 R, 179

[56] References Cited

UNITED STATES PATENTS

| | | | |
|---|---|---|---|
| 3,636,467 | 1/1972 | Babany et al. | 331/4 |
| 3,777,276 | 12/1973 | Klein | 331/4 |
| 3,820,100 | 6/1974 | Ballinger et al. | 331/1 A |

*Primary Examiner*—Siegfried H. Grimm
*Attorney, Agent, or Firm*—D. A. N. Chase

[57] ABSTRACT

A railroad train moving along an approach to a grade crossing (or other location of interest) is detected by apparatus that is responsive to the change in effect track inductance caused by the moving shunt. The tank circuit of an oscillator is connected to the track at the crossing and has an incrementally variable capacitor bank capable of compensating for the decrease in inductance that occurs as the train closes on the crossing, as well as slow inductance variations resulting from changing environmental conditions. The frequency of the oscillator output signal is continuously monitored, and correction pulses are produced when the signal frequency deviates from a preselected normal frequency. A digital control arrangement responds to each correction pulse and varies the compensating capacitance in increments to return the signal to the normal frequency. Motion detection circuitry also receives the correction pulses and activates the crossing warning system when the spacing between successive pulses corresponds to a predetermined repetition rate indicating that a train is approaching. Accordingly, under normal operating conditions, the oscillator frequency is held constant within a narrow range of deviation even when a train is approaching, but the rate of tank capacitance increase required to compensate for the continuous and rapid change in track inductance when a train is approaching is detected. The system also recognizes instantaneous changes such as would be caused by an artificial shunt or a broken rail, and distinguishes these from a moving train.

5 Claims, 11 Drawing Figures

DIGITAL AUTOMATIC OSCILLATOR TUNING CIRCUIT

This is a division of application Ser. No. 399,969, filed Sept. 24, 1973, now U.S. Pat. No. 3,838,270.

This invention relates to improvements in methods and apparatus for detecting a moving railroad train and, in particular, to the detection of motion by the effect of the changing track inductance on the capacitance of an oscillator tuning circuit required to maintain a constant oscillator frequency.

By way of background, motion detecting devices in current use in railroad grade crossing protection systems utilize the rails of the track as a transmission medium in order to execute the detection function. The track may be viewed as a transmission line in which both sides of the line are in close proximity to ground. The electrical parameters of such a transmission line include series inductance and series resistance in the rails themselves and shunt resistance and shunt capacitance from each rail to ground. The impedance of the transmission line varies in response to changing environmental conditions and, of course, undergoes a rapid variation when the two rails are shunted by the wheels of a moving train thereon.

The shunting effect of a set of train wheels is not a linear function with respect to the distance from a location on the track at which the detecting device is connected to the rails. Beyond some point on the track remote from this location, the presence or absence of a solid shunt between the rails can no longer be detected. In this distance, the track has reached its characteristic impedance. A shunt at any point closer than that at which the characteristic impedance is reached will have a measurable effect on the impedance of the track circuit, and the effect of the shunt increases rapidly as it moves closer to the point of measurement.

The impedance of the typical railroad track as seen from a given point of measurement consists of two parallel loads, one on each side of the measuring point. The lower of the two naturally predominates, and a rapid and continuous reduction in impedance of one of the parallel loads occurs as a train approaches from one direction. Motion detection devices currently in widespreaad use take advantage of this characteristic by applying an alternating current signal to the track at the measurement point, the frequency of the signal being relatively low in order to extend the range at which a moving train can be detected (the higher the frequency, the shorter the distance at which the characteristic impedance is reached).

Such devices are exemplified by U.S. Pat. No. 3,246,143 to C. M. Steele, et al., wherein a protection system is disclosed that applies a constant current alternating signal to the track adjacent the crossing. The resulting voltage picked off by a receiver is proportional to the impedance of the track circuit. This voltage will be affected by the presence or absence of a shunt at any point inside the point at which each arm of the track terminates in its characteristic impedance. Therefore, a moving shunt causes the receiver voltage to vary in time, and the differential of such voltage yields a motion voltage which is proportional to the rate of change of the receiver voltage (distance voltage). The motion voltage is employed to operate the warning devices at the crossing.

Although devices of the type just described have proven to be satisfactory in practice, they are undesirably sensitive to ballast resistance variations in the track circuit which affect detection time. The use of a power transmitter to excite the track with the constant current signal inherently increases the power drain on the batteries at the site. Furthermore, it is desired that systems of this type have the ability to recognize instantaneous changes in track characteristics, such as would be caused by an artificial shunt or a broken rail, and distinguish these occurrences from the presence of a moving train.

It is, therefore, an important object of the present invention to provide a method and apparatus for detecting a moving train, which are not subject to the disadvantages presented by devices of the type discussed above that employ a power transmitter connected with the track.

Another important object of this invention is to provide a method and apparatus as aforesaid that detect a moving train primarily in response to variations in the inductive portion of the track circuit impedance rather than the total impedance which includes a significant resistive component.

A further and important object of this invention is to provide a method and apparatus as aforesaid employing digital techniques to make possible a level of consistency in performance that would be difficult to achieve in analog systems.

Additionally, it is an important object of this invention to provide a system for railroad grade crossing protection which has the ability to recognize instantaneous changes in track characteristics and distinguish these from changes caused by a moving train, and which has a high degree of flexibility to adapt the system for use in various applications and for operation under many different conditions where the requirements of system sensitivity may differ widely.

A specific and important objective of the present invention is to provide a motion detection system for railroad applications wherein the inductive portion of the track circuit impedance forms a part of the tuning circuit of an oscillator that is maintained at a constant frequency, and wherein the rate of increase of the capacitance of the tuner required to compensate for the continuous and rapid decrease in the track inductance caused by an approaching train is employed in the detection circuitry of the system to recognize the approaching train.

Furthermore, it is a specific aim of this invention to provide a compensating capacitance as aforesaid which is variable in increments and is controlled by digital means in response to correction pulses produced when the oscillator frequency deviates from a preselected normal frequency.

Another specific aim is to provide a system as aforesaid wherein the presence or absence of a moving train is determined by the repetition rate of the correction pulses in order to distinguish between slow track inductance variations resulting from changing environmental conditions and the continuous and rapid decrease in track inductance occurring as a train closes on the track location of interest, and wherein the system is further capable of distinguishing both of the foregoing from an instantaneous change in track inductance such as would be caused by an artificial shunt on the approach or an open rail resulting from a break or an open rail joint.

Yet another specific aim is to provide a system as aforesaid which, once motion is detected, is capable of resensing motion in the event of a temporary abnormal condition such as a loss of the moving train shunt.

Additionally, it is an important object of the present invention to provide apparatus for automatically effecting the retuning of electrical equipment of the type where a variable capacitance tuner is controlled to maintain a constant oscillator signal frequency by monitoring the signal and operating the tuner if the frequency deviates from a preselected normal frequency due to inductance changes in the tuning circuit, in instances where the compensating control is rendered inoperable as a result of an excessive signal frequency deviation.

SUMMARY OF THE INVENTION

A variable frequency oscillator is employed having a tank circuit that includes the track circuit of the rails to which the oscillator is connected. An incremental tuner in the tank is provided by a bank of capacitors that are digitally controlled (switched into or out of the circuit) to compensate for changes in the inductive portion of the circuit resulting from variations in the inductance presented by the track. In a grade crossing protection system the track connections are made at the crossing; therefore, the oscillator is responsive to changes in the inductance of either of the two parallel arms of the track circuit extending physically in opposite directions from the crossing and defining the approaches thereto.

In the preferred embodiment of the invention to be described in detail hereinafter, an oscillator frequency of 195.3 Hz is employed, the oscillator output being fed to a bandpass filter having a band width of ±5 Hz at 3 db down. After shaping, pulses at the oscillator frequency are delivered to a period counter which, in conjunction with a digital comparator, monitors the oscillator and delivers an output if a deviation is sensed. "Up" correction pulses are produced in response to a high oscillator frequency (greater than 195.3 Hz), and "down" correction pulses are produced in response to a low oscillator frequency (less than 195.3 Hz). Digital control circuitry responds to the up and down correction pulses to respectively increase and decrease the tank capacitance to compensate for the inductance change and correct the oscillator frequency.

The delivery of an up correction pulse may or may not be indicative of a decrease in track inductance caused by the moving shunt effect of an approaching train. Whether this is the case is determined by motion detecting circuitry which receives the up correction pulses, but not the down correction pulses. If the spacing between successive up pulses is less than a preset maximum and a predetermined number of pulses (such as three) occurs, this corresponds to a pulse repetition rate that is considered by the detection circuitry to be indicative of the presence of a moving train. Accordingly, an output is delivered that, in a crossing protection system, is employed to operate the warning devices at the crossing location.

The motion detection function is accomplished by a reset timer in conjunction with a three stage shift register (or more as desired). The register is controlled by the reset timer, and must fill in order to produce the motion indicating output. However, once motion is detected, the temporary loss of the train shunt will not cause immediate deactivation of the warning devices as a time memory is employed to permit resensing of the train shunt and resumption of normal system operation.

In the island portion of the crossing, the warning devices are maintained in operation by a conventional island receiver. Once the train leaves the island, the motion detector apparatus resumes control and deactivates the warning devices since the up correction pulses previously produced are replaced by down correction pulses as the inductance of the track circuit now increases with movement of the train shunt away from the crossing.

A frequency doubler is interposed between the bandpass filter and the period counter and is activated by a self check timer in order to periodically exercise the apparatus to be certain that it will properly respond if a train appears on one of the approaches. Momentary doubling of the oscillator frequency simulates a moving train and causes the detection circuitry to respond; this response is not permitted to proceed to the point of actual delivery of a motion indicating output.

Besides discriminating between slow track inductance variations resulting from changing environmental conditions and the continuous and rapid decrease in track inductance occurring as a train closes on the crossing, the apparatus is also independently sensitive to an instantaneous change in track inductance such as would be caused by an artificial shunt on one of the approaches or an open rail resulting from a break or an open rail joint. This is accomplished by the insertion of a control gate between the output of the motion detecting circuitry and the relay that operates the warning devices. An instantaneous inductance change causes a sudden, extreme deviation in the oscillator frequency outside of the passband of the filter that is interposed between the oscillator and the period counter. The gate responds to loss of signal from the output of the bandpass filter to effect activation of the warning devices and maintain the same in operation until maintenance personnel can correct the defect.

As an option, automatic tuning circuitry is also provided in the present invention for those applications where it is desired to automatically retune the apparatus if the oscillator frequency shifts out of the passband. A train of retune pulses is applied to the digital control that operates the incremental tuning capacitors to cause step-by-step variation through the range of capacitance until the oscillator frequency shifts back within the passband and may once again be monitored by the period counter.

GENERAL DESCRIPTION OF THE APPARATUS

Figure 1:
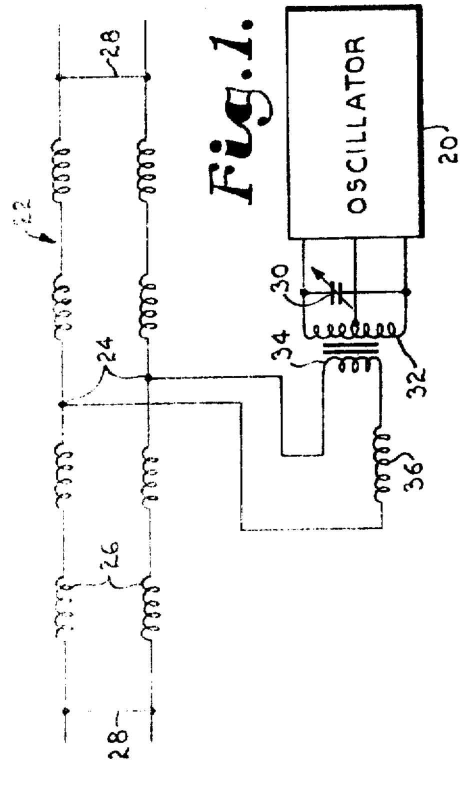
FIG. 1 is an electrical schematic diagram illustrating the inductive character of a railroad track and showing the same as part of the tank circuit of an oscillator.

In FIG. 1 a variable frequency oscillator 20 is shown connected to the rails of a railroad track 22 at a pair of points 24 at which a measurement of track inductance is to be made. In a grade crossing protection system, the points 24 would be adjacent the crossing. The series inductance of the rails is illustrated by the inductor symbols 26. The effective track inductance is presented by the two parallel arms of the track circuit extending from the points 24 in opposite directions and provided with terminating shunts 28. These are shown as wire shunts in FIG. 1, but it should be understood that capacitive or LC shunts could be utilized. The two terminating shunts 28 define the ends of a detection zone which may, for example, extend in each direction from the measurement points 24 a distance of from 500 to 3,000 feet. Alternatively, the shunts 28 may be omitted and each arm of the track would then terminate at some distance from the points 24 where the track reaches its characteristic impedance.

The oscillator 20 is provided with an incrementally tunable tank circuit as illustrated by the variable capacitor 30 in parallel with a tank coil 32. The coil 32 comprises the primary of a coupling transformer having a secondary winding 34 connected to the measurement points 24. A series inductor 36 is interposed in one of the leads from the secondary winding 34 to the respective point 24. The inductor 36 assures that some minimum amount of inductance will be present in the tank circuit even when the points 24 are directly shorted by a passing train.

Figure 2:
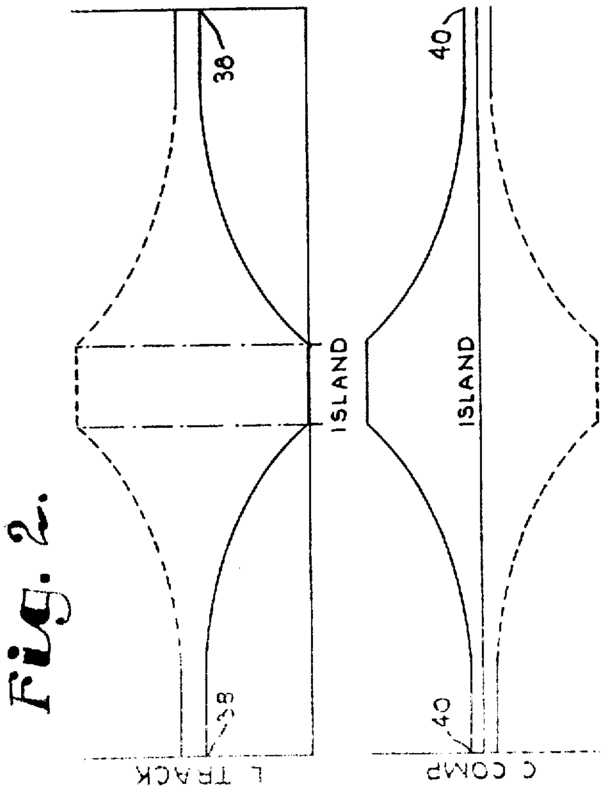
FIG. 2 is a graphical illustration portraying the change in track inductance with shunt location (and the compensating capacitance required), the effect of an open rail being illustrated in broken lines.

The compensating effect of the variable capacitor 30 is illustrated in FIG. 2. In both graphs a stretch of track is represented by the abscissa; the center portion identified "island" is that part of a crossing encompassed by the roadway (generally approximately 100 feet). When any set of wheels of the train is within the island, the island receiver responds and assures that the crossing warning is in operation. The present invention, however, is concerned with the approaches to the island as discussed above. The connections to the rails defining the measuring points 24 may be made anywhere in the island, but normally at one edge thereof where the island receiver is also connected.

The solid lines in the upper graph of FIG. 2 show the variation of track inductance with shunt location, beginning with a normal maximum value 38 at the terminating shunt and decreasing to 0 (direct short at the measuring points 24) as the shunt location reaches the island. The lower graph in FIG. 2 shows the corresponding capacitance required to maintain the oscillator frequency constant with movement of the shunt location. The variable capacitor 30 (actually a capacitor bank as will be discussed hereinafter) is at a low value 40 when the track circuit inductance is at the normal maximum 38, and increases to a maximum at the island. The graphical presentation of FIG. 2 also depicts the movement of a relatively short railway train along a stretch of track that crosses a highway where a crossing protection system is employed, in terms of the continuous and rapid change in track inductance (first decreasing and then increasing) characteristic of the presence of a passing train as sensed by the detector of the present invention.

The broken lines in the graphs of FIG. 2 represent an abnormal condition caused by an open rail. In the upper graph the inductance variation with open rail location is depicted, and in the lower graph the theoretical compensating capacitance is shown. However, this is negative capacitance which is an impossibility, thereby illustrating that the apparatus cannot compensate for the inductance change resulting from a broken rail or an open rail joint. Accordingly, such condition forces the oscillator 20 off frequency and, as will be discussed hereinafter, causes the crossing warning to stay in operation until the track defect is repaired.

Figure 3:
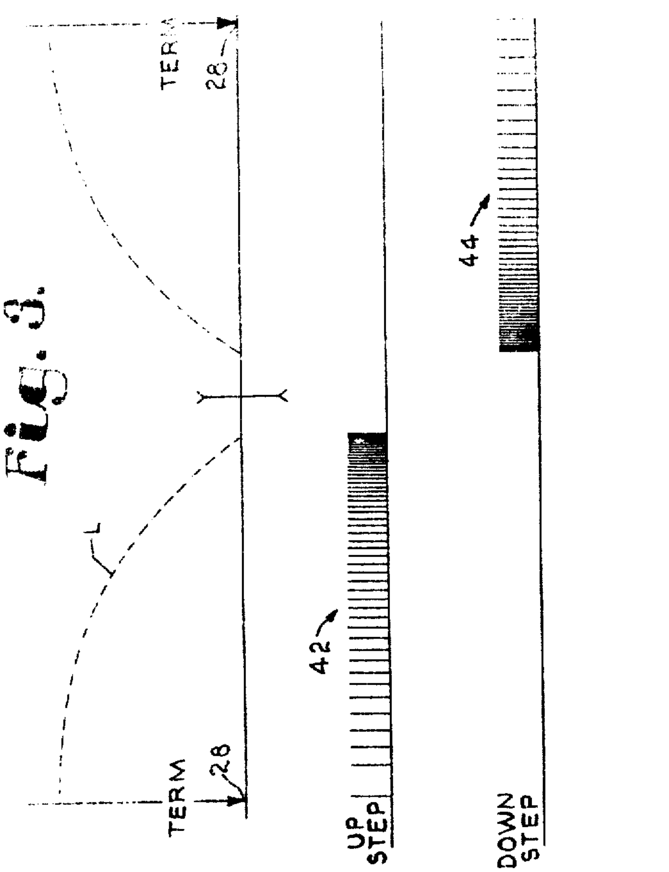
FIG. 3 is a graphical illustration of digital motion detection in accordance with the present invention and shows typical patterns of up and down correction pulses for a constant speed shunt.

FIG. 3 illustrates the resulting effect on the detector apparatus of a train traveling at constant speed and passing through a highway crossing protected by the present invention. The first graph is similar to that described above with reference to FIG. 2 and shows the variation in track circuit inductance L as the train traverses the stretch of track between the terminating shunts 28. Presuming that the train is approaching from the left viewing FIG. 3, the graph identified "up step" illustrates the pattern 42 of up correction pulses produced by the circuitry and required to maintain the oscillator frequency constant. Since the inductance decreases at an ever more rapid rate as the train closes on the crossing, upward corrections become gradually more frequent. Then, as the train moves away from the crossing, the graph identified "down step" illustrates the pattern 44 of down correction pulses that cause the removal of capacitance to compensate for the increasing inductance as the train (shunt) moves away. Each correction in itself is quite small; in a typical installation, several hundred correction steps may be required to compensate for a train moving the entire length of the detection zone between the terminating shunts 28.

It should be understood that the graphs of FIG. 2 are not to be interpreted as meaning that the inductance of the track remains at zero for shunt locations throughout the island. Actually, the inductance is zero only at the location where the shunt is directly across the measuring points 24. For practical purposes, however, the track inductance is considered to be zero in FIG. 2 for all shunt locations in the island since the measuring points 24 may be anywhere in the island at which connections to the rails may be conveniently made, and for the further reason that motion detection is not of concern when a train is in the island since the island transmitter-receiver system controls the crossing warning. (Zero inductance in the case of a moving train as illustrated in FIG. 3 may be considered as existing for the period of time required for the train to pass the points 24, due to the successive sets of train wheels passing thereover.)

Figure 4:
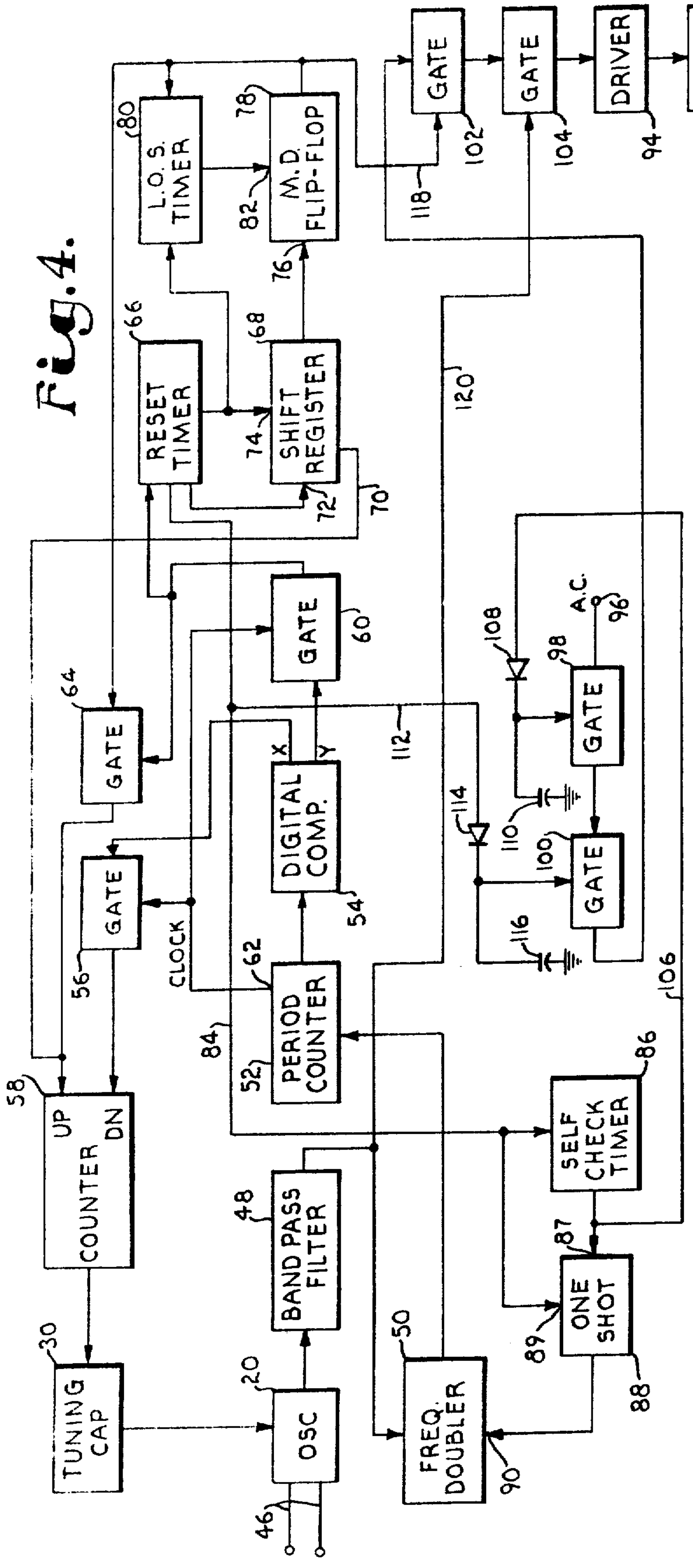
FIG. 4 is a block diagram of the digital motion detection apparatus of the present invention.

The foregoing description of FIGS. 1–3 introduces the description of the preferred embodiment of the apparatus to follow. Referring to FIG. 4, the oscillator 20 and the incrementally tunable capacitor bank 30 are illustrated in block diagram form. A pair of leads 46 extending from the oscillator 20 represent the feeders that are connected to the track at the measuring points 24. The output signal from the oscillator 20 is fed to a bandpass filter 48, and the filter output is delivered to the input of a frequency doubler 50. In normal operation, the doubler 50 is not activated; thus, the output thereof fed to the period counter 52 is at the oscillator frequency (195.3 Hz in the illustrated embodiment).

The period counter 52 monitors the oscillator frequency and delivers an output in digital form to a digital comparator 54 where deviations from the preselected normal frequency are sensed. The comparator 54 has two outputs identified X and Y, the former responding to a decrease in oscillator frequency and the latter responding to an increase therein. The X output is connected to a gate 56 whose output is delivered to the down counting input of counting circuitry 58 which digitally controls the compensating capacitance presented by the capacitor bank 30. The Y output of the comparator 54 is connected to one input of a gate 60. Both of the gates 56 and 60 are controlled by a clock output 62 from the period counter 52.

The down correction pulses are delivered by the gate 56 directly to the down counting input of the counting circuitry 58, but up correction pulses delivered by the gate 60 are fed both to a second gate 64 and to a reset timer 66 in the motion detecting circuitry. The reset timer 66 controls the operation of a three-stage shift register 68, any change in the state of its stages being transmitted to the up counting input of the counting circuitry 58 as indicated by a lead 70. The control connections to the register 68 from the timer 66 include leads to a clock input 72 and a reset input 74. The output of the final stage of the register 68 is connected to the set input 76 of a motion detection flip-flop 78 (of the set-reset type) that controls the gate 64. The output of the flip-flop 78 does not enable the gate 64 until the flip-flop 78 is set, indicating that a moving train has been detected. Accordingly, subsequent to detection, the up correction pulses reach the counting circuitry 58 directly via gates 60 and 64 without being processed by the timer 66 and the register 68. A time memory is provided by a loss of shunt timer 80 whose output is connected to the reset input 82 of the flip-flop 78.

A lead 84 from the reset timer 66 controls a self-check timer 86 that is part of a self-check system employed in the present invention. The purpose of this system is to exercise the apparatus during standby to be certain that, if called upon, it will function properly; the motion detection circuitry including the reset timer 66 and the shift register 68 is operated sufficiently to assure proper response of these elements to a moving train. The output of the self-check timer 86 is connected to the trigger input 87 of a monostable multivibrator or "one shot" 88, the output thereof comprising a pulse of controllable width that is fed to an activating input 90 of the frequency doubler 50. The lead 84 is also connected to a stop input 89 of the one shot 88 to control the termination of the generated output pulse. Operation of the doubler 50 by the one shot 88 causes momentary doubling of the oscillator frequency to thereby force a response from the period counter 52 in the same manner as if a moving train had suddenly appeared.

The warning devices at the crossing are activated in response to a relay 92. Battery power at the site is commonly employed for the warning lights and the gate mechanism, if the latter is utilized. For control purposes, however, an alternating current signal from an oscillator is employed which, when removed from the input of a relay driver 94, causes the relay 92 to drop out to thereby activate the warning devices. Accordingly, the apparatus is fail safe in that loss of the AC control voltage will result in activation of the warning. Such control voltage is available in FIG. 4 at a terminal 96. The gates 98, 100, 102 and 104 are flip-flops which respond to the alternating control voltage unless their DC operating voltage is removed. Accordingly, the output of the final control gate 104 will continue to excite the relay driver 94 as long as there is continuity back to the control voltage terminal 96, meaning that the flip-flops comprising gates 98, 100 and 102 are operating.

Operating voltage for the first gate 98 is maintained by the periodic recurrence of excitation on a lead 106 extending from the output of the self-check timer 86. A diode 108 is interposed in series with the lead 106, and a capacitor 110 is connected from the cathode of the diode 108 to circuit ground. Accordingly, a positive charge will be maintained on the capacitor 110 as long as the absence of an output from the self-check timer 86 does not exceed a time duration determined by the time constant of the discharging circuit. The voltage developed across capacitor 110 is employed to maintain DC operating potential on the flip-flop of gate 98.

In similar fashion, a lead 112 extends from lead 84 to the second gate 100 and has an isolation diode 114 interposed in series therein. As long as excitation is periodically applied to lead 84 by the reset timer 66, a positive charge is maintained on a capacitor 116 connected between the cathode of diode 114 and ground. This charge is utilized by the circuitry of gate 100 to maintain operating voltage on the flip-flop thereof. Accordingly, the gate 100 remains "open" unless there is a malfunction of the reset timer 66.

Operating voltage for the flip-flop of the gate 102 is controlled by the output of the motion detection flip-flop 78 as is represented by the lead 118. During standby (no train detected), voltage is maintained on lead 118 and the flip-flop of gate 102 is capable of operation.

The final control gate 104 derives operating voltage in a manner analogous to gates 98 and 100. A line 120 extending from the output of the bandpass filter 48 to the gate 104 illustrates that operating voltage for the flip-flop of gate 104 is dependent upon the presence of the oscillator signal at the filter output. Operating voltage is maintained as long as the oscillator frequency remains in the passband. It may be appreciated that loss of operating voltage for any one of the gates 98, 100, 102 and 104 will result in the removal of excitation from the relay driver 94 since one of the flip-flops in the chain will no longer be operative.

Figure 5A:
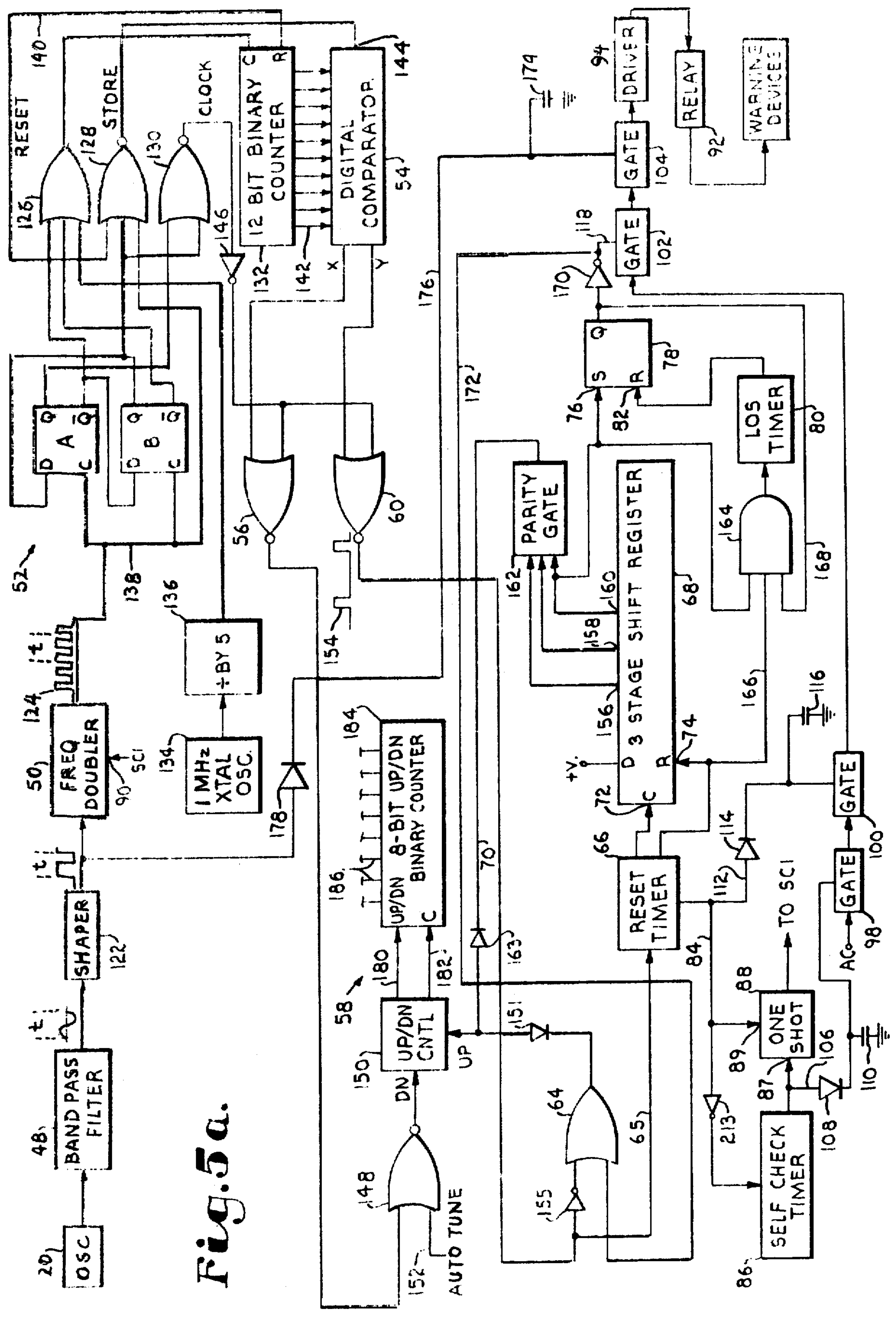
FIGS. 5*a* and 5*b* comprise a logic and schematic diagram illustrating the apparatus in greater detail.
Figure 5B:
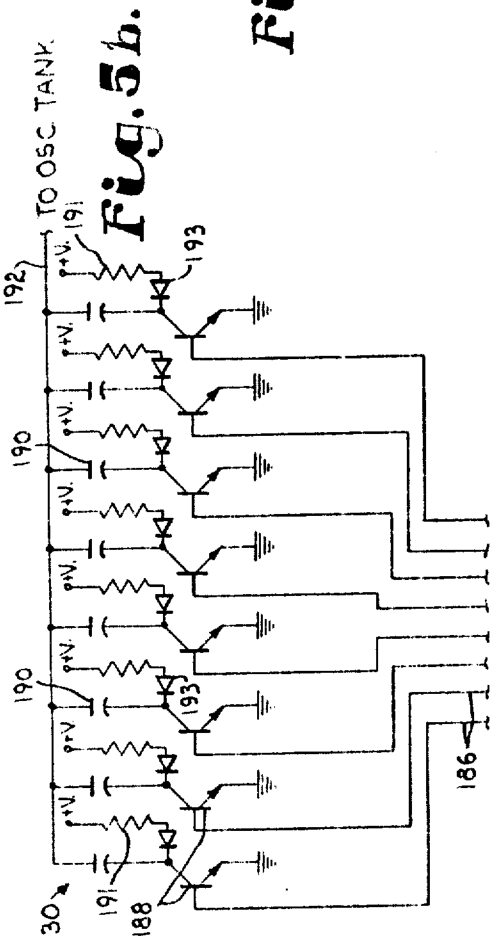

FIGS. 5*a* and 5*b* enlarge upon the block diagram of FIG. 4 and illustrate certain of the logic of the apparatus in greater detail. It should be understood that power connections furnishing the operating potential for the various circuit elements are omitted in FIGS. 4 and 5*a*. The ground symbols represent circuit ground and also correspond to the low logic level of the circuitry. Positive logic is utilized; therefore, the high logic level is a positive voltage corresponding to the positive supply voltage. This voltage is represented by the notation +V which appears in FIGS. 5*a*, 5*b*, 6, 7 and 8.

Referring to FIG. 5*a*, a shaper 122 is interposed between the bandpass filter 48 and the frequency doubler 50 for the purpose of converting the sine wave output of the filter 48 into a square wave prior to delivery to the frequency doubler 50. Further shaping is effected in the frequency doubler 50 as is evident from the pulses 124 illustrated at the doubler output. The solid lines show the output wave form when the doubler circuitry is unactivated; the period t is the same as that of the oscillator output. One positive pulse 124 of relatively short duration is produced at the beginning of each period of the oscillator output. The pulses in broken lines depict the effect when the doubler 50 is activated which, of course, reduces the period by one-half.

The period counter 52 includes a pair of type D flip-flops A and B, three NOR gates 126, 128 and 130, and a 12-bit binary counter 132. A time base is established by a 1 MHz crystal oscillator 134 whose output is fed to a divide-by-5 network 136. The NOR gate 126 has three inputs connected to the NOT Q ($\overline{Q}$) outputs of flip-flops A and B, and the output of the divide-by-5 network 136 respectively. The NOR gate 128 has three inputs connected to the NOT Q output of flip-flop A, the Q output of flip-flop B, and the output lead 138 from the frequency doubler 50. The NOR gate 130 has two inputs connected to the Q output of flip-flop A and the Q output of flip-flop B respectively.

The output lead 138 from the frequency doubler 50 is also connected to both clock inputs C of the two flip-flops A and B. The data input D of the flip-flop A is connected to the Q output of flip-flop B; the data input of flip-flop B is connected to the NOT Q output of flip-flop A. The NOT Q output of flip-flop A serves a reset function and is connected by a lead 140 to the reset input R of the counter 132.

Ten stages of the counter 132 are utilized in the illustrated embodiment as indicated by the ten digital leads 142 from the outputs of ten of the counter stages. The binary number on the leads 142 is received by the data inputs of the digital comparator 54 for comparison with the number 1,023. A count of 1,023 corresponds to an oscillator frequency of 195.3 Hz. The time base pulses are delivered by the output of the NOR gate 126 to the clock input C of the counter 132, and a store command is delivered by the output of the NOR gate 128 to the clock input 144 of the comparator 54.

The gates 56 and 60 are two-input NOR gates having a common input connected to the output of the NOR gate 130, the latter delivering clock pulses to these NOR gate inputs. An inverter 146 is interposed so that the clock pulses arriving at the NOR gates 56 and 60 will be inverted relative to the output of NOR gate 130. The other inputs of NOR gates 56 and 60 are connected to the X and Y outputs of the comparator 54 respectively.

The down correction pulses delivered by the output of the NOR gate 56 are fed to one input of a two-input NOR gate 148, the output thereof being connected to the down input of an up/down control 150 forming a part of the counting circuitry 58. The other input of the NOR gate 148 is connected to automatic tuning circuitry (FIG. 10) by a lead 152.

Up correction pulses 154 are illustrated in FIG. 5a at the output of NOR gate 60, such output being connected via an inverter 155 to one input of an OR gate comprising the gate 64 discussed above with reference to FIG. 4. The output of the gate 60 is also seen in FIG. 5a connected to the reset timer 66. The output of the OR gate 64 is connected to the up input of the up-down control 150 via an isolation diode 151.

The outputs 156, 158 and 160 of the respective stages of the three-stage shift register 68 are connected to a parity gate 162, the output thereof being connected by the lead 70 (with an isolation diode 163 interposed therein) to the up input of the up/down control 150. Besides being connected to the set input 76 of the motion detection flip-flop 78, the output 160 of the third stage of the shift register 68 is also connected to one input of a three-input AND gate 164. The other two inputs of the gate 164 are connected by a lead 166 to the reset input 74 of the register 68, and by a lead 168 to the Q output of flip-flop 78, respectively. The output of the AND gate 164 starts the LOS timer 80.

An inverter 170 has its input connected to the Q output of flip-flop 78, and its output is connected by the lead 118 to gate 102. The inverter output is also connected by a lead 172 to the lower input of the two-input NOR gate 64.

Operating voltage for the flip-flop of gate 104 is maintained by a charge on a capacitor 174 connected between a lead 176 and ground. The lead 176 extends from the output of the shaper 122 to the gate 104, and has an isolation diode 178 interposed in series therein.

Referring to the counting circuitry 58 and the capacitor bank 30 (FIG. 5b), the up/down control 150 has two output leads 180 and 182 connected to the up and down counting input (UP/DN) and the clock input C, respectively, of an 8-bit up/down binary counter 184. Eight digital leads 186 extend from the outputs of the eight sections of the counter 184 and are connected with the bases of eight switching transistors 188 respectively. If the high logic level (1-bit) is present on a particular lead 186, a positive voltage at the high logic level (or an amplified level) is delivered to the corresponding transistor 188 to switch the latter to its conductive state. The transistors 188 are of the NPN type, the collector of each being connected to one plate of a corresponding capacitor 190. The opposite plates of these capacitors 190 are connected to a common lead 192 that is connected to the oscillator tank coil 32 (FIG. 1). A series-connected resistor 191 and diode 193 for each transistor 188 extend from the positive supply to the collector thereof with the diode 193 being poled to maintain current flow through the corresponding capacitor 190 when the transistor 188 is conducting and the current reverses during the negative swing of the oscillating wave.

Although not illustrated in FIG. 5b, a fixed capacitor is preferably connected between the common lead 192 and ground in order to provide a constant minimum value of capacitance that is in the circuit irrespective of the logic levels on leads 186. Accordingly, this fixed capacitor and the eight capacitors 190 form the capacitor bank represented by the variable capacitor 30 illustrated in FIG. 1. In the illustrated embodiment, the values of the capacitors 190 are selected so that an increase or decrease of one count corresponds to a step up or step down of 0.005 ufd. At the maximum count of 255, all of the capacitors 190 are connected in parallel by the presence of the high logic level on all eight of the leads 186; this results in a total capacitance from lead 192 to ground of 1.275 ufd, plus the value of the fixed capacitor (which may be 2.0 ufd, for example).

DETAILED DESCRIPTION OF THE RESET TIMER

Figure 6:
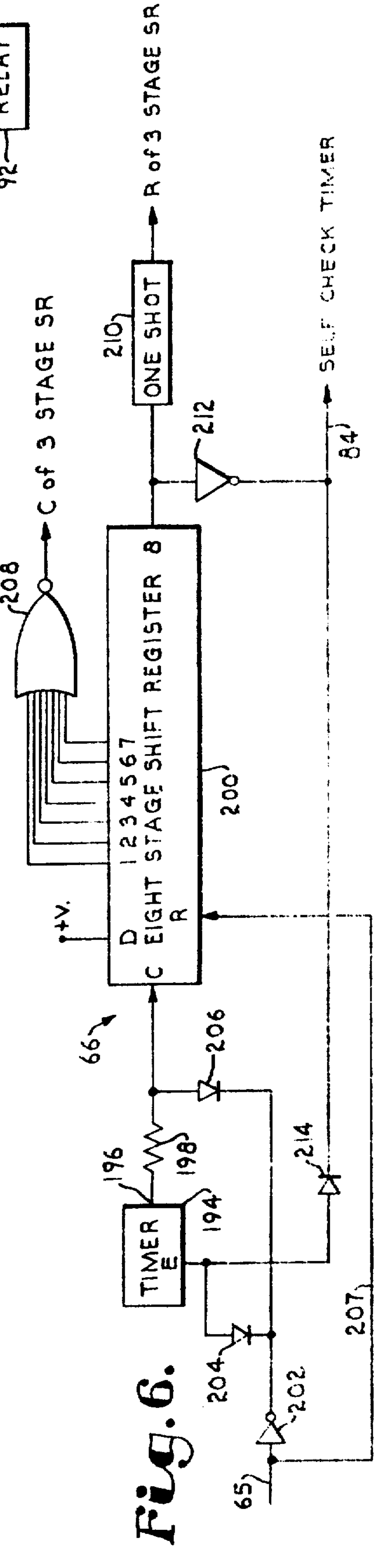
FIG. 6 is a detailed illustration of the reset timer shown in FIG. 5*a;*

The reset timer 66 of the motion detection circuitry is shown in greater detail in FIG. 6. An integrated circuit timer 194 is operated in the astable mode and has an enable input E and an output 196, the latter being normally at the high logic level and connected by a series resistor 198 to the clock input C of an eight-stage shift register 200. The signal delivered at the timer output 196 is essentially a square wave that oscillates between the high and low logic levels, the frequency of oscillation being governed by the charge and discharge times of a capacitor (not shown) external to the integrated circuit. The enable input E of the timer 194 is normally maintained at the low logic level and in such condition constitutes a short to ground across the external timing capacitor. When the low level is removed, the capacitor is free to charge and the timer is thereby released for astable operation. A number of integrated circuit timers of this type are presently commercially available, such as the NE/SE 555 monolithic timing circuit manufactured by Signetics Corp. of Sunnyvale, Calif., U.S.A. A detailed technical description thereof appears in an article by Eugene R. Hnatek entitled "Put the IC timer to work in a myriad of ways," published in the Mar. 5, 1973, issue of EDN, pages 54–58, such description being incorporated herein by reference as may be necessary for a full and complete understanding of the circuit configuration and operation of timers of this type.

Comparing FIG. 6 with FIG. 5*a*, the lead 65 delivers the up correction pulses 154 from the output of NOR gate 60 to the input of the reset timer 66. It may be seen in FIG. 6 that an inverter 202 is interposed in the input lead 65 and has its output connected to the enable terminal E of the IC timer 194 by a diode 204. A diode 206 also connects the output of the inverter 202 to the clock input C of the register 200. The diodes 204 and 206 are poled with their cathodes connected to the inverter output.

A lead 207 extends from the lead 65 to the reset input R of the register 200. The data input D thereof is maintained at the high logic level as indicated by the +V notation. The outputs of the first seven stages of the register 200 are received by a seven-input NOR gate 208, the output thereof being connected to the clock input 72 of the three-stage shift register 68 (FIG. 5*a*). The output of the eighth stage of the register 200 is fed directly to the control input of a one shot 210, and the output of the one shot 210 is connected to the reset input 74 of the three-stage shift register 68.

The output of the eighth stage of the register 200, through an inverter 212, is also connected by the lead 84 (and an inverter 213 seen in FIG. 5a) to the self-check timer 86, and is further connected by a diode 214 to the enable input E of the timer 194. In the absence of the detection of motion, the output of the eighth stage of the register 200 is at the high logic level; therefore, the output of the inverter 212 is low and this is reflected at the enable input E of timer 194, the diode 214 being poled as shown with its cathode connected to the inverter output.

DETAILED DESCRIPTION OF THE DOUBLER, UP/DOWN CONTROL AND AUTOMATIC TUNING

Figure 7:
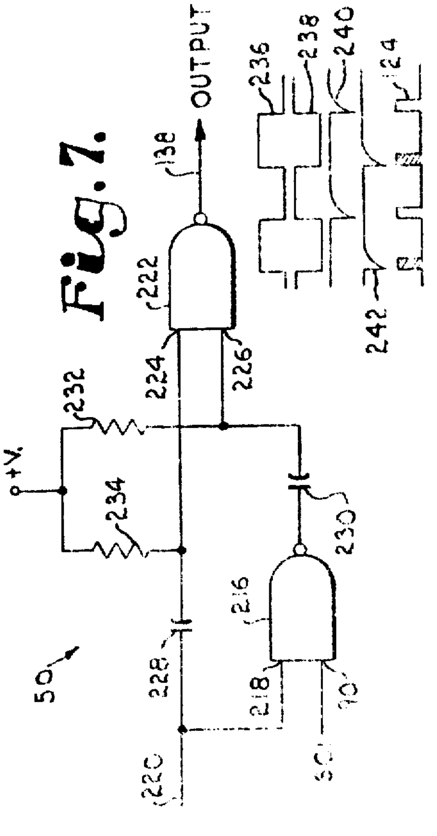
FIG. 7 is a schematic diagram of the frequency doubler shown in FIG. 5*a*, with accompanying wave forms.

The frequency doubler 50 is shown in detail in FIG. 7. A NAND gate 216 has a pair of inputs, one presenting the activating input 90 of the doubler and the other input 218 being connected to a lead 220 extending from the output of the shaper 122. When the self-check system is not in operation, the input 90 is at the low level; therefore, the output of the NAND gate 216 remains at the high level and is unaffected by the presence of the shaper output signal on lead 220. A NAND gate 222 has a pair of inputs 224 and 226 connected to lead 220 and the output of NAND gate 216 by capacitors 228 and 230 respectively, and delivers an output along the lead 138 which is at the same frequency as the input signal on lead 220 as long as the self-check activating input 90 is at the low logic level.

When the self-check input 90 is high, the doubler 50 is activated and the inverted leading edge of the input signal at the output of NAND gate 216 is differentiated by resistor 232 and capacitor 230, and applied to the input 226 of the NAND gate 222. The trailing edge of each input pulse is differentiated by resistor 234 and capacitor 228 and applied to the input 224 of NAND gate 222. Since two differentiations occur with each input pulse, the pulse repetition rate at the output of the NAND gate 222 is twice the frequency of the input pulses on lead 220. The wave form 236 illustrated in FIG. 7 is the input signal on lead 220, the wave form 238 is the signal at the output of NAND gate 216 after inversion, the wave form 240 shows the differentiated pulses at the input 224, the wave form 242 shows the differentiated pulses at the input 226 (only when the self-check input 90 is activated), and the output pulses 124 appearing on lead 138 are shown at the doubled repetition rate. The shaded output pulses are not produced unless the self-check input 90 is activated.

Figure 8:
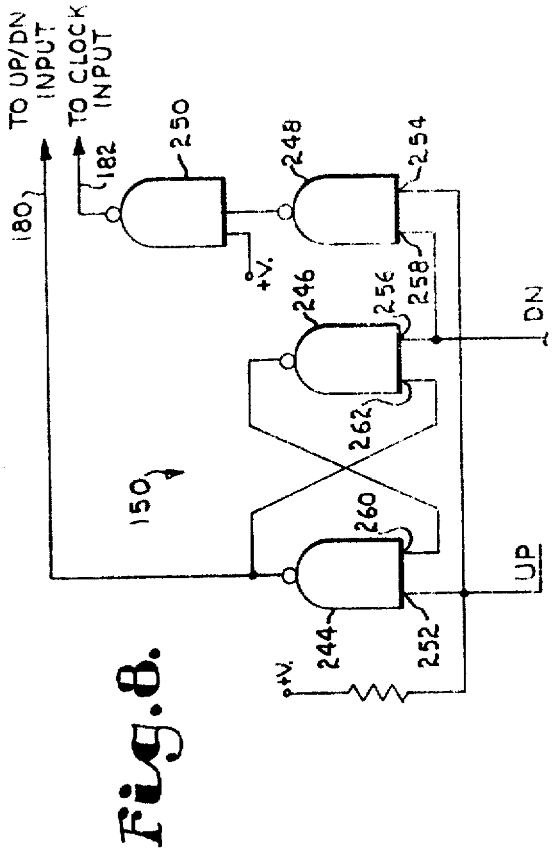
FIG. 8 is a logic diagram of the up/down control shown in FIG. 5*a;*

The up/down control 150 is shown in detail in FIG. 8. Four 2-input NAND gates 244, 246, 248 and 250 are employed in the control 150 and provide a logic interface between the up and down inputs of the control 150 and the two inputs of the binary counter 184 (FIG. 5*a*). The up input of the control 150 is presented by one input 252 of the NAND gate 244 in common with one of the inputs 254 of the NAND gate 248. The down input of the control 150 is presented by the common inputs 256 and 258 of the NAND gates 246 and 248 respectively. The other inputs 260 and 262 of the NAND gates 244 and 246 are cross-connected with the respective outputs of these gates, and the output lead 180 extends from the output of gate 244. This arrangement maintains the output lead 180 at the high logic level unless down correction pulses appear at the input 256 of NAND gate 246. Due to inversion of the correction pulses by the action of the NOR gate 148 (FIG. 5*a*), the input 256 receiving the down correction pulses is normally at the high logic level. As down correction pulses appear, the logic level on output lead 180 goes low with each pulse to command the binary counter 184 to execute a downcount in response to correction pulses received at its clock input C.

The inputs 254 and 258 of the NAND gate 248 of the control 150 receive the up and down correction pulses respectively; the input 254 receiving the up correction pulses is also normally at the high logic level due to inversion in previous circuitry. Accordingly, the output of the NAND gate 248 follows the inverse of either of its inputs, and the succeeding NAND gate 250 serves as an inverter so that the correction pulses are reproduced on the output lead 182. Therefore, the correction pulses delivered along lead 182 to the clock input C of the binary counter 184 cause the latter to count up if lead 180 stays high, and count down if the level on lead 180 goes low with each correction pulse.

Figure 10:
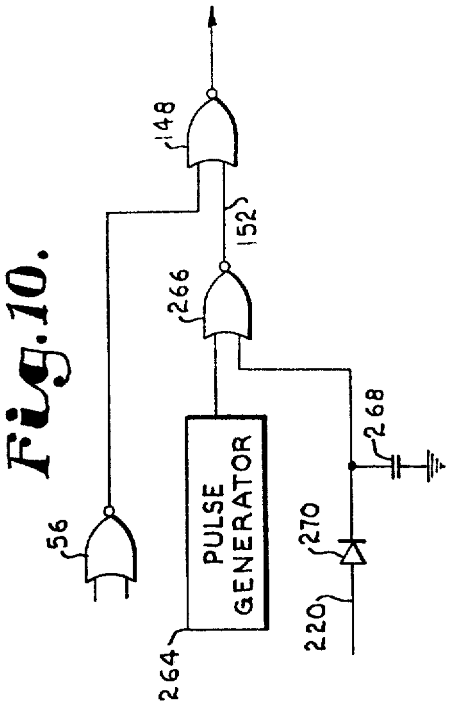
FIG. 10 is a diagramatic illustration of the optional automatic tuning circuitry employed with the apparatus of FIGS. 5*a* and 5*b*.

The automatic tuning circuitry is illustrated in FIG. 10 and is optional depending upon the application as will be discussed hereinafter when the general operation of the apparatus is set forth. A pulse generator 264 operates continuously and may comprise a multivibrator having a frequency approximately two or three times the normal frequency of the oscillator 20. The output of the pulse generator 264 is fed to one input of a two-input NOR gate 266, the second input thereof being normally maintained at the high logic level by a positive charge across a capacitor 268. The capacitor is charged by the shaper output signal appearing on lead 220, a diode 270 being in series with lead 220 between the shaper output and the positive, ungrounded plate of the capacitor 268.

As long as the shaper output is uninterrupted, capacitor 268 remains charged and holds NOR gate 266 closed. However, if the oscillator frequency deviates from the ±5 Hz passband of the filter 48, the shaper output is lost, capacitor 268 discharges, and NOR gate 266 opens. Pulses from the generator 264 in inverted form are now delivered at the output of NOR gate 266 and appear on the lead 152.

OPERATION

The frequency of the output signal from the oscillator 20 is subject to changes in the track inductance measured at the points 24 (FIG. 1) as discussed in the preceding description. The inductance change may be rapid due to the presence of a moving train in the detection zone, or slow due to the effect of changing environmental conditions. The oscillator frequency is monitored by the period counter 52 and the digital comparator 54 shown generally in FIG. 4, and up or down correction pulses are produced in response to deviations from the preselected normal frequency (195.3 Hz in the present example).

Figure 9:
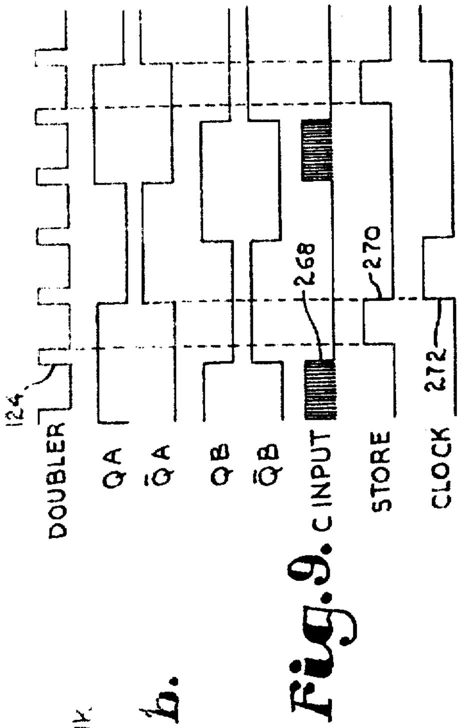
FIG. 9 is a timing diagram illustrating the operation of the period counter.

The operation of the period counter 52 is best understood with reference to FIGS. 5a and 9. The timing diagram of FIG. 9 shows the wave forms at various points in the period counter circuitry. With the frequency doubler 50 unactivated, the output pulses 124 therefrom appear as illustrated in FIG. 9 and initiate operation of the period counter 52 by their application to the clock inputs C of the flip-flops A and B. In response to the first pulse 124, the Q output of flip-flop A goes high and the NOT Q output thereof goes low. Since the NOT Q output of flip-flop B is already low, the two low logic levels from the two NOR Q outputs delivered to corresponding inputs of the NOR gate 126 open the latter and permit delivery of the time base pulses from the output of NOR gate 126. These time base pulses are obtained from the output of the divide-by-5 network 136 and thus are at a frequency of 200 KHz.

The burst of time base pulses may be seen at 268 in FIG. 9 and are applied to the clock input C of the binary counter 132. The burst terminates on the leading edge of the next pulse 124 from the doubler 50, as the NOT Q output of flip-flop B goes high. The count now stored in the counter 132 equals a number representing the duration of the period of the oscillator output signal, and this number is 1,023 if the oscillator is on frequency.

The next event occurs when the second pulse 124 goes low, as it may be seen that a store pulse 270 is generated on the trailing edge of pulse 124. At this time all three inputs to the NOR gate 128 are at the low level, since the NOT Q output of flip-flop A is low, the Q output of flip-flop B is low, and the doubler output is now low. The store command represented by the pulse 270 clocks the data inputs of the comparator 54 which, via digital leads 142, are holding the count information from the counter 132. If the number is equal to 1,023, both the X and the Y outputs of the comparator 54 remain at the high logic level. If the number is less than 1,023 (oscillator frequency high), the Y output goes low while the X output remains high. Conversely, a number greater than 1,023 (oscillator frequency low) causes the X output to go to the low level while the Y output remains high.

Assuming for the moment that the oscillator is on frequency, both of the NOR gates 56 and 60 will be held closed and will not respond to the clock pulse 272 produced at the output of the NOR gate 130 on the trailing edge of the store pulse 270. The clock pulse 272 is generated at this time since the Q output of flip-flop A goes low and the Q output of flip-flop B is already low, as is clear in FIG. 9. This sequence repeats to thereby sample the oscillator frequency once every four oscillations.

If the count stored in the counter 132 is less than 1,023, an up correction pulse as illustrated at 154 in FIG. 5a is produced at the output of the NOR gate 60 in response to the clock pulse 272. With the Y output of the comparator 54 now low, the gate 60 responds to the clock pulse 272 (inverted by the inverter 146) to deliver the positive up correction pulse 154 to the inverter 155 preceding OR gate 64 and to the input lead 65 of the reset timer 66. Conversely, if the oscillator frequency is low and the count stored in counter 132 is greater than 1,023, then the low level at the X output causes a similar action at the NOR gate 56 to direct a down correction pulse to the NOR gate 148. Accordingly, if there is a deviation from the preselected normal oscillator frequency, a correction pulse (either up or down) will be produced upon each occurrence of the clock pulse 272 until the frequency is corrected.

It will now be assumed that a frequency correction is to be made in response to a down correction pulse. Down correction pulses would be produced, for example, in response to a slow inductance increase caused by changing environmental conditions or a rapid increase characteristic of a train moving away from the measuring points 24 (see FIGS. 1–3). The down input of the up/down control 150 does low in response to the correction pulse, and output lead 180 likewise goes low as discussed hereinabove in the detailed description of the up/down control 150. The down correction pulse is reproduced on the output lead 182; thus, the binary counter 184 steps its count down one. This decreases by one increment the capacitance presented by the capacitor bank 30 due to the action of the appropriate switching transistor or transistors 188 depending upon the previous count level.

If instead, however, it is assumed that an up correction pulse is delivered by the NOR gate 60, a unique action occurs which will now be explained. Since the motion detection flip-flop 78 is reset, the output from the inverter 170 is high and lead 172 is thus maintained at the high logic level; therefore, the OR gate 64 is disabled (its output is maintained high) and the up correction pulse 154 can only pass via lead 65 to the reset timer 66. It is presumed that the apparatus has been in standby and that this is the first up correction pulse 154 to be received.

Now referring to FIG. 6, the up correction pulse 154 on lead 65 is conducted to the reset input R of the shift register 200 by the lead 207. The register 200 resets on the positive level of the incoming correction pulse, and is clocked on the trailing edge thereof. In this latter regard, note that the correction pulse in inverted form is delivered to the clock input C of register 200 by the diode 206. As the register 200 is reset, the output of its eighth stage goes from the high to the low level; therefore, after the reset function, the output from inverter 212 is high and the IC timer 194 is thereby released for operation.

Now regarding the NOR gate 208 responsive to the first seven stages of the register 200, the only time that the output of gate 208 can be at the high level is at a time when all seven of its inputs are low. This occurs during the reset function when the correction pulse is applied by lead 207 to the reset input R. Accordingly, the output of the NOR gate 208 follows the condition of the input lead 65; therefore, each correction pulse 154 is reproduced at the output of the NOR gate 208 in time coincidence with its actual occurrence.

Actual operation of the timer 194 commences just after the correction pulse has reset the register 200 and clocked it, since the timer remains inoperative during the correction pulse by virtue of the diode 204 which maintains its enable input E at the low level. After the correction pulse, the outputs of both inverters 202 and 212 are high; thus, the low level or ground is removed from the timer enable and astable operation commences. The first stage of the shift register 200 is high, and subsequent stages go from low to high in succession in response to the signal from the timer output 196 which excites the clock input C of register 200. If the register fills before another up correction pulse 154 is received, the timer 194 is reset and held inoperative.

A comparison of FIGS. 5*a* and 6 reveals the net effect of filling the eight-stage shift register 200. When its last (eighth) stage goes high, the one shot 210 is triggered and a reset pulse is delivered from the one shot output to the reset input 74 of the three-stage shift register 68 (FIG. 5a). Accordingly, any information previously stored in the register 68 is lost; in the present example, the first output 156 of the register 68 would be high before the register is reset, due to the previous delivery of a pulse (contemporaneous with the correction pulse) from the output of NOR gate 208 to the clock input 72 of register 68. When the output 156 went from low to high, the parity gate 162 sensed a change in the output condition of the three stages of register 68 and delivered a pulse along lead 70 to the up input of the up/down control 150. Accordingly, the up step correction was made in the same manner as a down step except that the count in the binary counter 184 now increases by one. The output lead 180 from the control 150 remains high.

The frequency of the astable timer 194 is set in accordance with the desired sensitivity; the eight-stage shift register 200 may, for example, fill in two seconds. Therefore, for the three-stage shift register 68 to accumulate three pulses, each of such pulses must arrive within two seconds after the preceding pulse. This means that the spacing of the up correction pulses 154 must be less than two seconds or the register 68 will be cleared by the reset timer 66 without any pulses being accumulated in memory.

From the foregoing, it may be appreciated that the reset timer 66 determines the repetition rate of up correction pulses that will be considered by the apparatus as indicative of the presence of a moving train, since the motion detection flip-flop 78 is set only when a total of three pulses is accumulated in the shift register 68. More particularly, when the output 160 of the third stage goes high, flip-flop 78 is set and the output of the inverter 170 goes low, thereby rendering the gate 102 inoperative and causing the relay 92 to drop out. Also, the presence of the low logic level on lead 172 enables the OR gate 64 so that subsequent up correction pulses 154 (inverted by inverter 155) are fed directly to the up input of the up/down control 150.

Summarizing the operation of the apparatus in detecting a moving train, the effort required to maintain the oscillator frequency within the passband of the filter 48 is effectively measured by the motion detection circuitry. The rate of variation of the capacitance presented by the capacitor bank 30 is governed by the repetition rate of the up correction pulses 154, and this rate is measured by the reset timer 66 and the three-stage shift register 68 to determine if a moving train is present. In the example set forth above, a series of three up correction pulses 154, wherein the second and third pulses occur within two seconds after the first and second pulses respectively, is considered as an indication that a train is moving along one of the approaches to the crossing.

A condition may occur where the train shunt is momentarily lost due to failure of the wheels to make solid electrical contact with the rails, or the train may stop momentarily and thus a moving shunt is no longer presented. Under such conditions, an output is produced by the AND gate 164 in FIG. 5a to start the loss-of-shunt timer 80. Since motion has been detected, the Q output of flip-flop 78 is high. Also, the three-stage shift register 68 will be full; hence, output 160 is high. If the train stops or the shunt is lost as the train is closing on the crossing, up correction pulses will cease to be produced and the eight-stage shift register 200 will fill, triggering the one shot 210 and causing the delivery of a positive reset pulse to the reset input 74 of the shift register 68. These represent the input conditions of the AND gate 164 which is activated on the leading edge of the reset pulse appearing on lead 166.

The loss-of-shunt timer 80 may include an integrated timing circuit of the same type as employed in timer 194, except that it would be operated in the monostable mode as a one shot having an on time of from 10 to 15 seconds, for example. The flip-flop 78 cannot be reset until the end of this timing period, thereby maintaining the delivery of the motion indication at its Q output and permitting motion to be resensed during such period. If the resensing of motion does occur, the output 160 of register 68 is raised to the high logic level and this level is held on the set input 76 of flip-flop 78; therefore, resetting would not occur at the end of the timing period since the reset pulse from the output of timer 80 would be ineffective.

When the apparatus is in standby, the self-check system is in operation. Referring to FIGS. 5a and 6, it will be remembered that the eight-stage shift register 200 is full when the astable timer 194 is not in operation; hence, the output from the eighth stage of the register 200 is high. At the time that the eighth stage goes high, the lead 84 goes low due to the inverter 212. This transition, inverted again by the action of inverter 213, releases the trigger and reset inputs of the self-check timer 86; simultaneously, the enable input E of the astable timer 194 also goes low as discussed above and maintains timer 194 inoperative.

The self-check timer 86 operates as a one shot and may comprise an integrated circuit timer as employed in the astable timer 194, except that in the self-check timer 86 the integrated timing circuit is operated in the monostable mode. The output of the inverter 213 is connected to the trigger and reset inputs of the circuit, and the positive level at such output at the time that lead 84 goes low as mentioned above initiates the timing cycle. The output of the self-check timer 86 goes from the low to the high logic level and remains at the high level for the preset period (such as one second). The trigger input 87 of the one shot 88 receives the output from timer 86 and responds to the negative transition at the end of the one-second period when the timer output goes from the high back to the low level. Accordingly, being edge triggered on negative transitions, the one shot 88 is activated after the timer 86 times out. The output pulse from the one shot 88 is fed to the activating input 90 of the frequency doubler 50 to simulate a sudden oscillator frequency change such as would occur by the presence of a moving train. The period counter 52 and the digital comparator 54 respond, and an up correction pulse 154 is produced at the output of the NOR gate 60. This is delivered to the reset timer 66 via lead 65 in the usual manner, and the reset timer 66 and the three-stage shift register 68 respond.

As discussed hereinabove with respect to actual motion detection, the incoming up correction pulse resets the eight-stage shift register 200 via the lead 207. The output of the eighth stage of register 200 now goes low, and lead 84 goes high. The stop input 89 is a switching input responsive to positive transitions which terminates the output pulse being delivered by the one shot 88. This may be done by providing an output NOR gate (not shown) in the one shot 88 which is disabled by the high level on lead 84. Accordingly, the frequency doubler 50 reverts to its unactivated state and further up correction pulses are not produced. The astable timer 194 times out, the output of the eighth stage of register 200 goes high once again, and the self-check cycle repeats. Thus, in the illustrated embodiment, the apparatus is exercised at approximately three-second intervals when in standby operation. It is important to note that the three-stage shift register 68 is not permitted to fill during self-check operation in order to prevent a false indication of motion detection.

The self-check system provides for the exercising of a number of the vital components of the apparatus. It may be appreciated that the single up correction pulse will be followed by a single down correction pulse during each self-check cycle following deactivation of the frequency doubler 50. If, for example, the binary counter 184 responds to up corrections but not to down corrections, then ultimately the output of the oscillator 20 would be shifted outside of the passband of filter 48 and there would be no output from the shaper 122. This would result in discharge of the capacitor 174 and ultimate closing of gate 104, thereby activating the warning devices. Taking another example, if the up correction pulse is not produced during a self-check cycle, then the eight-stage shift register 200 will not be reset and further operation of the self-check timer 86 and the one shot 88 will cease. This also causes ultimate activation of the warning devices since a periodic positive output is required from the self-check timer 86 in order to maintain the capacitor 110 charged. The time constant associated with capacitor 110 should permit the gate 98 to remain operative for short periods of inactivity of the self-check timer 86 such as will occur during normal accumulation of pulse information in the three-stage shift register 68 in the process of motion detection, but not longer periods indicative of a malfunction. Furthermore, lead 84 will remain at the low logic level and capacitor 116 will ultimately discharge; thus, gate 100 will no longer be held open. As far as any malfunction of the reset timer 55 or the self-check timer 86 is concerned, it is evident that both must operate during exercising or gates 98 or 100 will activate the warning.

Besides recognizing track inductance changes caused by a moving train, the apparatus also has the ability to recognize instantaneous changes in inductance and distinguish these from a moving train. A sudden shunt across the rails within the detection zone (known as an artificial or false shunt) will cause an instantaneous decrease in inductance that will drive the oscillator frequency out of the passband of filter 48 before the period counter 52 and subsequent circuitry have time to respond. An open rail creates the opposite condition as illustrated in FIG. 2, and compensation is impossible. In either case the oscillator frequency shifts out of the passband and the output from shaper 122 is lost, thereby removing the rectified signal from lead 176 and permitting the capacitor 174 to discharge, thereby rendering gate 104 inoperative. The same action occurs if the apparatus fails to retune when the automatic tuning circuitry of FIG. 10 is employed.

The automatic retuning feature provided by the circuitry of FIG. 10 is optional and may not be used in certain applications where it is desired that the warning devices stay in constant operation until the defect is corrected that caused the oscillator frequency to shift out of the passband. In other applications, however, it may be appreciated that the pulse generator 264 provides a rapid and advantageous means of returning the oscillator to the normal frequency. When output from the shaper 122 is lost, the NOR gate 266 opens and pulses from the generator 264 are delivered along the lead 152. Accordingly, the binary counter 184 counts down until the oscillator frequency returns within the passband, whereupon NOR gate 266 recloses and the period counter 52 again monitors the oscillator frequency. It may be desired that the train of retune pulses from the generator 264 be directed to the up input of the up/down control 150 instead of the down input thereof as illustrated; in some instances this modification would be preferred because for sudden shunts such as caused by track switches, an increase in the compensating capacitance would be required.

Having thus described the invention, what is claimed as new and desired to be secured by Letters Patent is:

1. Automatically tuned electrical apparatus comprising:

means for producing an oscillatory electrical signal and having variable tuning means capable of controlling the frequency of said signal;

means responsive to said signal for periodically sampling the frequency thereof to sense a deviation in said frequency from a preselected normal frequency, and delivering an output pulse upon the sensing of said deviation;

control means coupled with said deviation sensing means and said tuning means for operating the latter to correct the frequency of said signal and return the same to said normal frequency in response to the output pulses from said sensing means;

frequency responsive means coupled between said signal producing means and said sensing means for interrupting delivery of said signal to said sensing means if the frequency thereof deviates from said normal frequency by a preselected amount to thereby render said sensing means inoperable; and pulse generating means responsive to interruption of delivery of said signal for exciting said control means with a train of retune pulses to cause the control means to operate said tuning means until the frequency of said signal is returned to within said preselected amount of deviation, whereby to provide automatic retuning in the event that the sensing means is incapable of correcting the signal frequency due to insufficient response to a rapid deviation thereof.

2. The apparatus as claimed in claim 1, wherein said tuning means is variable in increments, and wherein said control means effects step-by-step variation of said tuning means in response to pulses received from said sensing means or said pulse generating means.

3. Automatically tuned electrical apparatus comprising:

means for producing an oscillatory electrical signal and having variable tuning means capable of controlling the frequency of said signal;

means responsive to said signal for sampling the frequency thereof to sense a deviation in said frequency from a preselected normal frequency, and delivering an output upon the sensing of said deviation;

control means coupled with said deviation sensing means and said tuning means for operating the latter to correct the frequency of said signal and return the same to said normal frequency in response to said output from the sensing means;

frequency responsive means coupled between said signal producing means and said sensing means for interrupting delivery of said signal to said sensing means if the frequency thereof deviates from said normal frequency by a preselected amount to thereby render said sensing means inoperable; and pulse generating means responsive to interruption of delivery of said signal for exciting said control means with a train of retune pulses to cause the control means to operate said tuning means until the frequency of said signal is returned to within said preselected amount of deviation, whereby to provide automatic retuning in the event that the sensing means is incapable of correcting the signal frequency due to insufficient response to a rapid deviation thereof.

4. The apparatus as claimed in claim 3, wherein said tuning means is variable in increments, and wherein said control means effects step-by-step variation of said tuning means in response to said train of retune pulses.

5. The apparatus as claimed in claim 4, wherein said control means includes a plurality of digital control connections operably coupled with said tuning means, and a counter whose output comprises said digital control connections and which has input means for receiving said retune pulses.

* * * * *